United States Patent [19]
Gladow

[11] 3,710,631
[45] Jan. 16, 1973

[54] ROTARY MOTION APPARATUS

[75] Inventor: Dean E. Gladow, Albuquerque, N. Mex.

[73] Assignee: Rolamite, San Francisco, Calif.

[22] Filed: Nov. 25, 1970

[21] Appl. No.: 92,655

[52] U.S. Cl. ................................................74/89.2
[51] Int. Cl. ..............................................F16h 27/02
[58] Field of Search........74/89.2, 89.21, 89.22, 216.5

[56] References Cited

UNITED STATES PATENTS

| | | |
|---|---|---|
| 3,491,603 | 1/1970 | Harris................................74/89.22 |
| 2,113,164 | 4/1938 | Williams..............................318/28 |
| 1,998,136 | 4/1935 | Jeanichen et al......................74/89.2 |
| 3,592,069 | 7/1971 | Welch..................................74/89.2 |
| 322,712 | 7/1885 | Harris................................74/89.22 |
| 2,917,986 | 12/1959 | Williamson..........................74/89.2 |
| 3,204,472 | 9/1965 | Gorgens et al. ......................74/89.2 |
| 3,373,619 | 3/1968 | Tate et al. ............................74/89.2 |

*Primary Examiner*—Milton Kaufman
*Assistant Examiner*—Wesley S. Ratliff, Jr.
*Attorney*—Burns, Doane, Swecker & Mathis

[57] ABSTRACT

Apparatus for transmitting rotary motion from an input member to an output member, both of which rotate about a common axis. A roller is mounted on a guide surface concentric with the central axis and the roller is retained by a thin flexible band as it rolls along the guide surface. The roller acts as a planetary and is connected between the input and output members. Relative sizes of the roller and input and output members can be selected to provide any desired amount of rotary motion reduction or amplification, including high degrees of amplifications not readily accomplished by other means.

20 Claims, 10 Drawing Figures

PATENTED JAN 16 1973 3,710,631

INVENTOR
DEAN E. GLADOW

BY Burns, Doane, Swecker & Mathis

ATTORNEYS

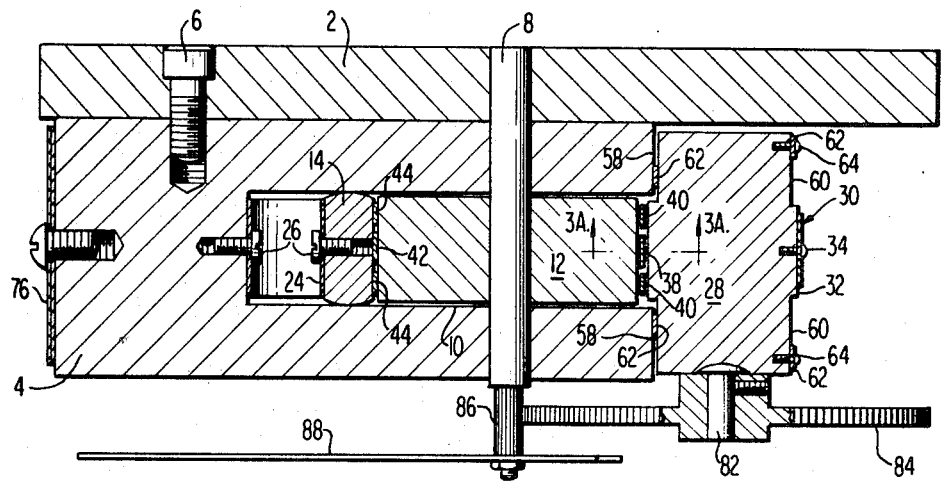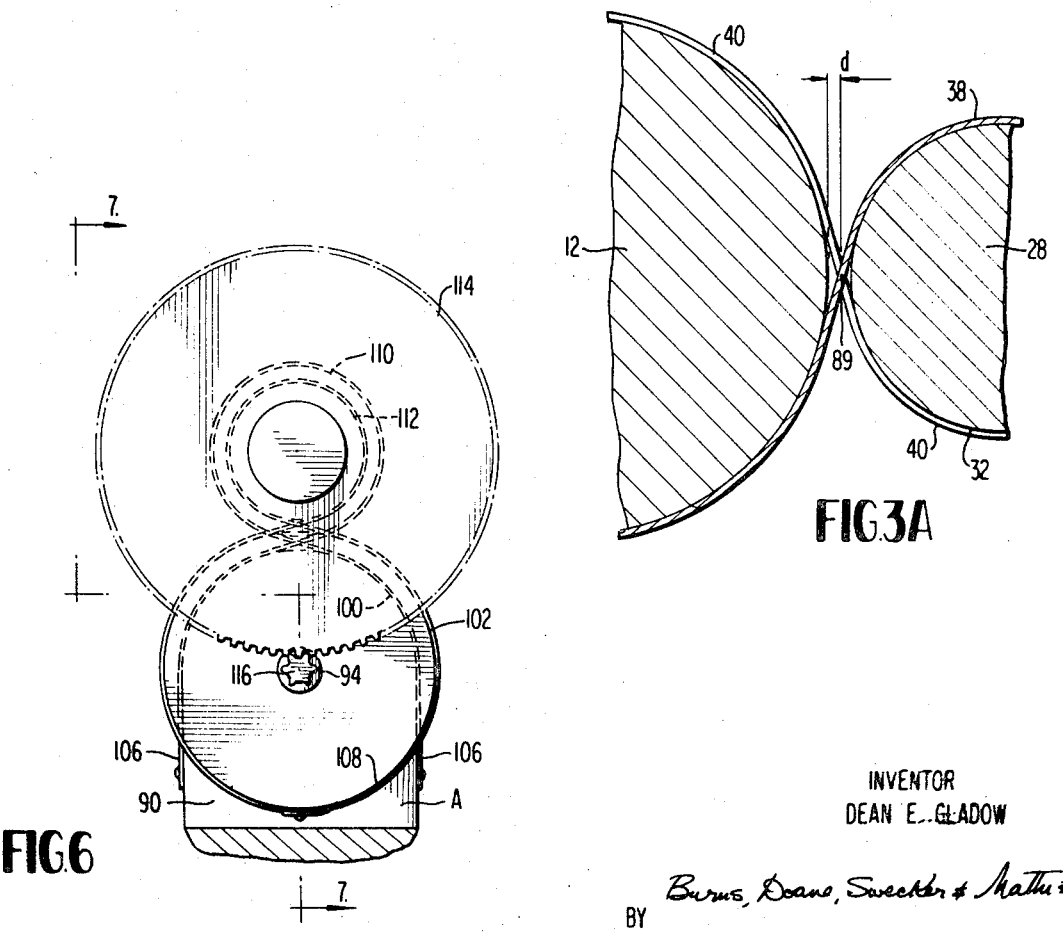

INVENTOR
DEAN E. GLADOW

BY Burns, Doane, Swecker & Mathis

ATTORNEYS

ROTARY MOTION APPARATUS

BACKGROUND OF THE INVENTION

This invention relates to motion transmitting apparatus and, more particularly, to apparatus for providing amplified rotary motion between input and output members.

Rotary motion transmission devices typically employ gears for providing an increased or reduced rate of rotation of an output shaft in relation to the rate of rotation of an input shaft. The gears ensure that slippage does not occur between the input and output shafts, as it does in belt drives or hydraulic couplings, for example. In a speed reduction transmission, for example, a small diameter pinion drives a gear at a rate of rotation that is proportional to the ratio of the pitch diameters of the gears. The degree of speed reduction that can be obtained using a pinion of a certain size is limited by the size of the output gear which will fit within the transmission case. Reducing the size of the pinion may improve the degree of speed reduction, but if the pinion is made too small, it cannot be adequately supported on a shaft for transmitting the required torque.

Also, the teeth of the gear must be machined accurately in order to minimize frictional resistance and to provide an accurate angular relationship between the input and output shafts, if that is necessary. Machining of gears, particularly those having a small diameter, is a slow and costly operation. As a result, gear transmissions are relatively expensive.

A single gear mesh consisting of one gear and one pinion requires two shafts and, typically, four bearings. If a larger degree of speed reduction is desired than that readily obtainable with a single gear mesh, multiple gear meshes are often used. This, in turn, requires a corresponding increase in the number of shafts and bearings. The large number of components required adversely affects the total manufacturing cost. The large number of bearings means that more energy is lost through friction.

SUMMARY OF THE INVENTION

In view of these disadvantages in prior rotary motion transmitting apparatus, it is an object of this invention to provide improved rotary motion transmitting apparatus.

It is a further object of this invention to provide rotary drive apparatus that is capable of producing a high ratio of angular motion between input and output rotary shafts, without requiring an excessive number of components, or components which are difficult to manufacture or assemble.

A still further object of this invention is to provide rotary motion transmitting apparatus having less frictional resistance to relative rotation between components, and requiring fewer bearings than prior apparatus.

These objects are accomplished in accordance with a preferred embodiment of the invention by rotary motion transmitting apparatus having a guide surface that is concentric with a base axis. A wheel is mounted for rotation about the base axis and a roller is supported on the guide surface in engagement with the wheel. A gear or similar drive device transmits rotary motion from the roller to a shaft on the base axis. The radius of the guide surface about the base axis is different from the radius of the wheel, and this differential produces amplified rotation of the roller relative to the guide surface upon rotation of the wheel. The roller is preferably held against the guide surface by a thin flexible band which encircles the roller. Thus, amplified rotary motion occurs between the wheel and the shaft.

This invention includes various embodiments in addition to the previously disclosed embodiment. In one embodiment, the wheel may be held stationary and the guide surface may be mounted for rotation about the base axis. In another embodiment, the guide surface and the wheel are both mounted for rotation about the base axis, but the shaft is held stationary. In still another embodiment, the wheel, the guide surface and the shaft may all be mounted for rotation about the base axis in the manner equivalent to a geared differential.

DETAILED DESCRIPTION OF THE DRAWINGS

These preferred embodiments are illustrated in the accompanying drawing in which:

FIG. 3 is a cross-sectional view of the apparatus along line 3—3 in FIG. 1;

FIG. 3A is an enlarged cross-sectional view of the apparatus along the line 3A — 3A in FIG. 3;

FIG. 6 is an elevational view of apparatus in accordance with a second embodiment of the invention;

DETAILED DESCRIPTION OF PREFERRED EMBODIMENTS

Figure 1:
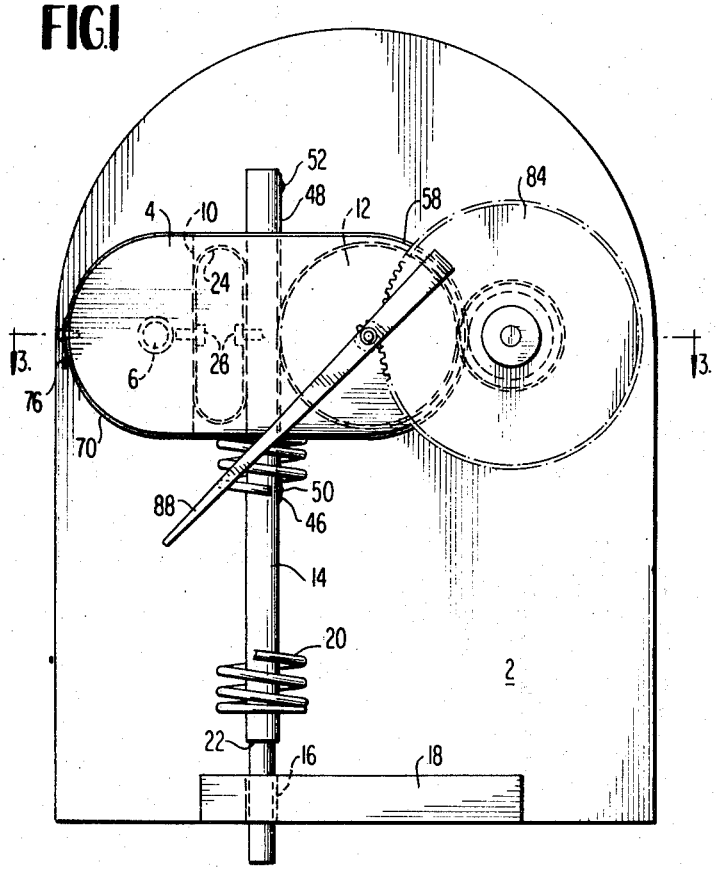
FIG. 1 is a side elevational view of a first embodiment of the motion transmitting apparatus of this invention.

A device for transmitting amplified rotary motion in accordance with this invention is illustrated in FIGS. 1 to 5. The device include a base 2 on which a guide block 4 is secured by means of a screw 6. A shaft 8 extends through aligned holes in the base 2 and in the guide block 4 and is secured against rotation relative to the block 4.

The guide block 4 includes a transverse slot 10. A wheel 12 is journaled for rotation on the shaft 8 within the slot 10. A stem 14 projects through the slot 10 and is guided at its lower end by a hole 16 in a flange 18 projecting outwardly from the base 2. The stem 14 is urged downwardly by a coil spring 20. A shoulder 22 on the stem restrict downward movement by engagement with the upper surface of the flange 18.

The spindle 14 is urged toward the wheel 12 by a spring loop 24 which is positioned between the spindle 14 and the bottom of the slot 10. The spring loop 24 is in the form of a thin, resiliently flexible band which forms a closed loop. The flexing of the band at opposite ends of the loop exerts a force on the spindle in the direction of the wheel 12, but allows the spindle 14 to move longitudinally while the band in the loop 24 essentially rolls across the surface of the spindle 14 and the bottom surface of the slot end. Screws 26 extend through holes in the band 24 to prevent the band from sliding relative to the guide block 4 and the spindle 14.

Figure 5:
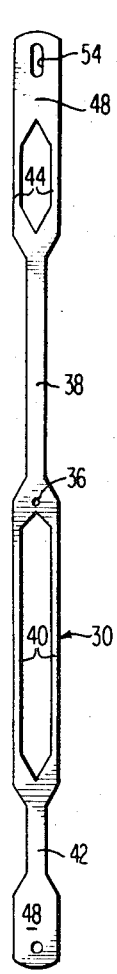
FIG. 5 is a plan view of the inner band.
Figure 4:
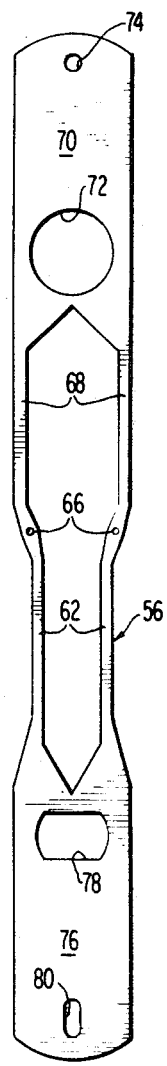
FIG. 4 is a plan view of the outer band.
Figure 2:
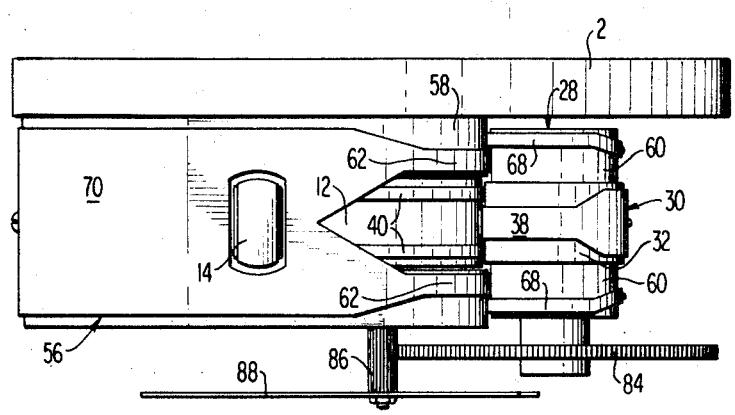
FIG. 2 is a top plan view of the apparatus of FIG. 1.

A roller 28 is connected with the wheel 12 by a thin resiliently flexible band 30. The band 30 is shown in FIG. 5 prior to assembly. The mid-portion of the band 30 is secured to the surface 32 of the roller by a screw 34 which passes through a hole 36 in the band to prevent slippage of the band relative to the surface 32. The band 30 extends in opposite directions around the circumference of the surface 32 and the narrow portion 38 passes through the slot formed between laterally spaced strips 40 in the band. Thus, the portions of the band 30 cross each other as they pass between the surface 32 of the roller 28 and the surface of the wheel 12. The band 30 continues in opposite directions around the circumference of the wheel 12 and the portions of the band cross each other again as the band passes between the spindle 14 and the wheel 12. This band crossing takes place as the narrow portion 42 near one end of the band passes through the slot formed between laterally spaced strips 44 adjacent the opposite end of the band. The ends 46 and 48 of the band extend along the surface of the spindle 14 and are secured by screws 50 and 52. As shown in FIG. 4, the end 48 of the band has a longitudinal slot 54 to allow applying tension in the band while it is being assembled. If desired, an extension may be formed on the end 48 of the band to allow gripping of the end of the band with a tool to apply tension. After the screw 52 secures the end 48 in place, the extension may be cut or broken off from the remainder of the band.

A second band 56, which is shown in FIG. 4 prior to assembly, holds the roller 28 against the guide surface 58 formed on the guide block 4. The guide surface 58 is concentric with the axis of rotation of the wheel 12. The roller 28 has cylindrical surfaces 60 on opposite sides of the central surface 32. The mid-portion of the band 56 has a pair of strip 62 which are spaced apart on opposite sides of a central slot. The strips 62 are secured to the roller 28 by screws 64 which extend through holes 66 provided in the band strips 62. The band strips 62 extend from the holes 66 in opposite directions around the surfaces 60 of the roller. As shown in FIG. 3, the portions of the strip 68 on the left side of the holes 66 are spaced apart a distance greater than the spacing between the outer edges of the strips 62. The narrower width of the band along the strip 62 extends through the slot between the strips 68 as the band passes between the guide surface 58 and the roller 28. The end portion 70 of the band 56 extends along the lower surface of the guide block 4 and a hole 72 is provided in the band to allow the spring 20 and the spindle 14 to pass through the band. The end portion 70 also has a hole 74 to receive a screw 76 to secure the band against sliding relative to the guide block 4.

The opposite end 76 of the band 56 extends along the upper surface of the guide block 4 and has an opening 78 through which the spindle 14 extends. The end portion 76 also has a longitudinal slot 80 for receiving the screw 76 and by pulling on the end portion 76, tension is applied in the band 56 before the screw 76 is tightened to hold the band securely in place.

The roller 28 include an extension 82 on which a gear 84 is secured. The hub of the gear has a set screw which engages the extension 82 to prevent rotation of the gear relative to the roller 28. The fixed shaft 8 is counterbored to receive a rotary shaft 86 which has external gear teeth. The geared shaft 86 meshes with the teeth on the periphery of the gear 84. A pointer 88 is mounted on the end of the shaft 86 to provide an indication of the degree of rotation of the shaft relative to the wheel 12. Of course, instread of the pointer 88, any appropriate rotary device can be driven from the shaft 86 in response to rotation of the wheel 12.

In operation, upward movement of the spindle 14 unwraps the end portion 48 of the band 30 from the wheel 12, thereby imparting rotation to the wheel in a clockwise direction as viewed in FIG. 1. The band strips 40 progressively unwrap from the surface of the wheel 12 and wrap onto the surface 32 of the roller 28. At the same time, the narrow portion 38 of the band progressively unwraps from the surface of the roller 28 and wraps onto the surface of the wheel 12. At the same time, the band 56 which holds the roller 28 against the guide surface 58 progressively wraps and unwraps from the roller, as the roller rotates. Due to the difference in diameter between the surface 32 and the surface 60, the central axis of the roller 28 moves progressively along an arc in a counterclockwise direction as viewed in FIG. 1 about the axis of the shaft 8. As the roller 28 rotates, the gear 84 also rotate in a counterclockwise direction, which rotation is imparted to the geared shaft 86 to rotate the pointer 88 in a clockwise direction. As soon as the force on the spindle 14 is released, the spring 20 urges the spindle downwardly, thereby rotating the wheel 12 in a counterclockwise direction and driving the pointer 88 in a counterclockwise direction through the roller 28.

The amplification achieved by this apparatus is a function of the difference in diameter between the surface 32 which is driven by the wheel 12 and the surface 60 which rolls along the guide surface 58. Assuming that the bands 30 and 56 do not have significant thickness, the ratio of the rate of rotation of the shaft 86 relative to the rate of rotation of the wheel 12 is expressed by the following equation:

$$\frac{W_d}{W_a} = \frac{1 - \frac{R_{bd} R_c}{R_{bd} R_c}}{1 - \frac{R_a R_{bc}}{R_a R_{bc}}}$$

In the above equation, $R_d$ is the pitch radius of the geared shaft 86, $R_c$ is the radius of the guide surface 58, $R_{bc}$ is the radius of the roller at the surface 60, $R_a$ is the radius of the wheel 12, $R_{ba}$ is the radius of the roller at the surface 32, and $R_{bd}$ is the pitch radius of the gear 84. From the above equation, it can be seen that as the ratio of the radius $R_c$ to the radius $R_d$ approaches unity, the ratio of $R_{ba}$ to $R_{bc}$ must also approach unity and the denominator of the above fraction approaches zero and the ratio of the angular velocity of the shaft 86 to the angular velocity of the wheel 12 has its maximum value. If the gear 84 were replaced by a belt pulley and a corresponding belt pulley were mounted on the shaft 86, with an open belt passing over the pulleys, the equation expressing the ratio of angular velocities given above would be the same, except that the minus sign in the numerator would be changed to a plus sign. Since the degree of amplification obtained by the apparatus of this invention is a function of the ratio of the various diameters, the actual size of the roller and the guide surfaces can be selected according to the particular requirements of the apparatus. For example, a larger roller and thicker band can be used for transmitting reasonably large torque, without changing the amplification ration, provided the ratio of the various radii remain the same.

It should also be noted that the directions of motion indicated above for the apparatus of FIGS. 1 to 5 depend upon the relative sizes of the differential diameters of the components. By changing these relative sizes, the directions of motion can be changed, if desired. This si also true as to the embodiments of FIGS. 6 and 8.

Since the bands 30 and 56 are formed of resiliently flexible material, the bands have a tendency to return to their original flat shape. Therefore, when the bands cross, for example between the roller surface 32 and the wheel surface 12, as shown in FIG. 3A, the axis of intersection (indicated at 89) between the narrow portion of the band 38 and the laterally spaced strip portions 40 is spaced from the respective surface a distance "d," which is greater than one-half the thickness of the band. Therefore, by applying a radial force against the roller 28, it is possible to displace the surface 32 toward the surface of the wheel 12, but such displacement is resisted by the resiliency of the band and progressively greater force is required as deflection progresses. Similarly, if a force is applied to the roller 28 in a direction radially outward from the wheel 12, the bands yield resiliently to allow a limited outward displacement, but after a short displacement, the force required for further displacement increases rapidly until it substantially equals the force necessary to sever the band in tension. Thus, the roller is continually urged toward a neutral position with respect to the cooperating curved surfaces, but if the roller or the band should encounter irregularities in the concentricity of the various curved surfaces, the bands are capable of deflecting sufficient to accommodate these imperfections. This flexibility also allows the roller to pass over dust or dirt particles which may be present on the bands or on the surface.

One significant source of friction and resultant energy loss is the rotation of the wheel 12 with respect to the fixed shaft 8. The magnitude of the energy loss is highly dependent upon the force of contact between the two components. Correct choices for the radii of the guide surface 58, the wheel 12, and the roller 28, and the thicknesses of the bands 30 and 56 can reduce the force of contact to very small values. In addition, the band flexibility discussed above allows small variations of radii or band thicknesses to occur without resultant high contact forces. Therefore, manufacturing tolerances can be relaxed without significantly affecting the energy loss of the device.

Figure 7:
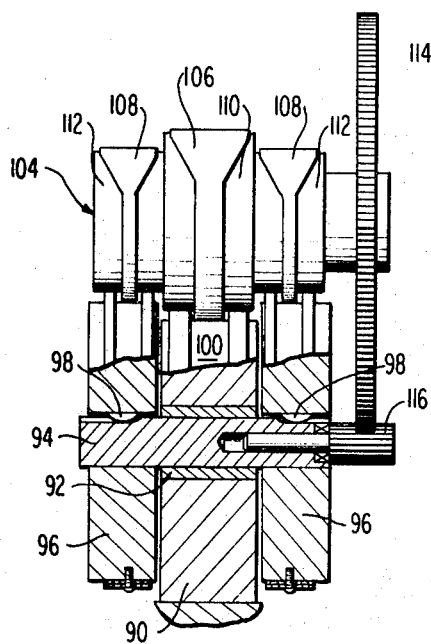
FIG. 7 is a cross-sectional view of the apparatus along the line 7—7 in FIG. 6.

A second embodiment of the invention is illustrated in FIGS. 6 and 7. In this embodiment, a stationary guide member 90 has a central bore in which a bearing 92 is mounted to support a shaft 94 for rotation relative to the stationary member 90. A pair of wheels 96 are secured on the shaft 94 by keys 98 or other suitable means, so that the wheels 96 rotate together as a unit.

The stationary member 90 has a cylindrical surface 100 which is concentric with the peripheral surfaces 102 of the wheels 96. A roller 104 corresponding to the roller 28 in FIGS. 1 to 5 is supported on the respective surfaces 100 and 102 by thin resiliently flexible bands 106 and 108. The band 106 is looped around the larger diameter surface 110 of the roller and is secured to opposite sides of the stationary member 90, as shown in FIG. 6. The band 106 corresponds generally to the band illustrated in FIG. 5, but includes merely a narrow section corresponding to the section 28 in FIG. 5 and a pair of spaced strips corresponding to the strips 40, shown in FIG. 5. The band crosses between the surface 110 and the surface 100 in the same manner as does the band 30, illustrated in FIGS. 1 to 3. The bands 108 have the same general form as the band 106, except that the opposite ends of the bands are secured in overlapping relation to the respective wheels 96. The roller 104 has a smaller diameter surface 112 on which the bands 108 are wrapped. At the end of the roller, a large diameter gear 114 is secured. The gear 114 meshes with gear teeth on a shaft 116 which is journaled for rotation in bearings mounted in the shaft 94.

When the shaft 94 is rotated in a clockwise direction as viewed in FIG. 6, the relative motion between the wheels 96 and the stationary guide member 90 imparts motion to the roller 104. Due to the differential in diameter between the larger surface 110 and the smaller surface 112, the central axis of the roller 104 is progressively displaced in a clockwise direction, as viewed in FIG. 6. As the roller rotates, the gear 114 also rotates in a clockwise direction, thereby imparting a counterclockwise rotation to the shaft 116.

The degree of amplification between the shaft 94 and the shaft is expressed by the following equation:

$$\frac{W_D}{W_c} = \frac{1 - \frac{R_a R_{bd}}{R_{ba} R_d}}{1 - \frac{R_a R_{bc}}{R_{ba} R_c}}$$

In the above equation, $R_a$ is the radius of the member surface 100, $R_{bd}$ is the pitch radius of the gear 114, $R_d$ is the pitch radius of the large diameter surface 110 of the roller, $R_{bc}$ is the radius of the small diameter surface 112 of the roller, and $R_c$ is the radius of the wheels 96. As an alternative, the gears 114 and 116 may be replaced by a pair of belt pulleys and an open belt mounted over the pulleys. In this alternative arrangement, the speed ratio expressed by the equation above, remains the same, except that the minus sign in the numerator is changed to a plus sign.

Figure 8:
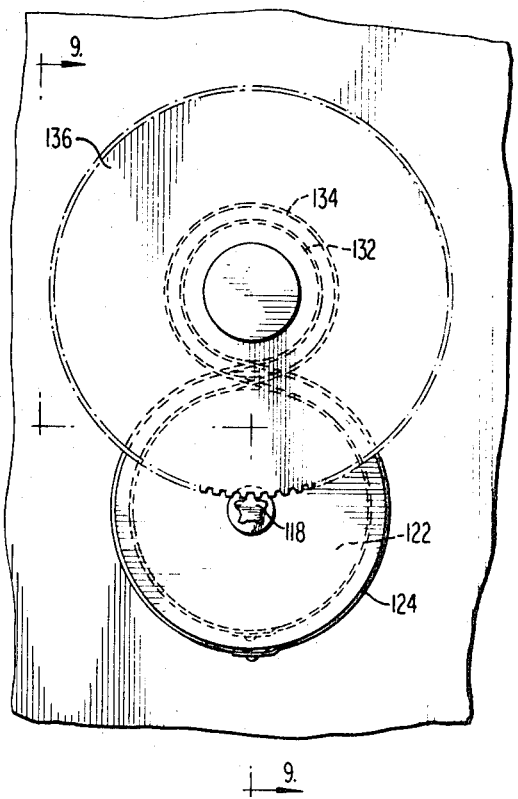
FIG. 8 is an elevational view of motion transmitting apparatus in accordance with a third embodiment of this invention.
Figure 9:
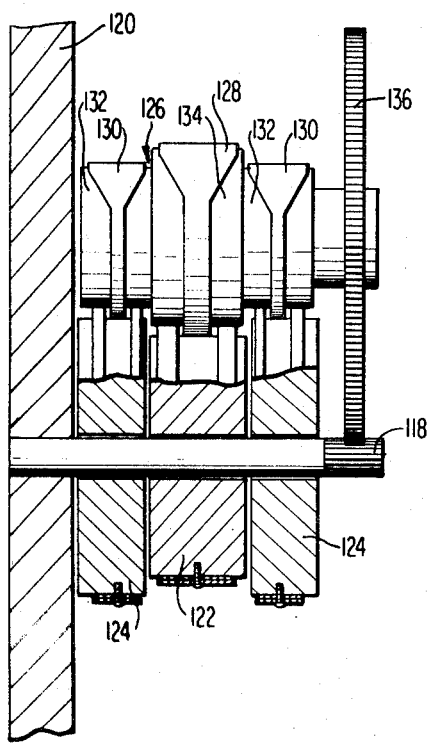
FIG. 9 is a cross-sectional view of the apparatus along the line 9—9 in FIG. 8.

A third embodiment of the invention is illustrated in FIGS. 8 and 9. In this embodiment, a fixed shaft 118 projects outwardly from a support 120. An inner wheel 122 is supported on bearings on the shaft 118 for rotation. Outer wheels 124 are similarly supported on the shaft 118 for rotation relative to the shaft and relative to the wheel 122. A roller 126 is mounted on the wheels 122 and 124 by band 128 and 130 which correspond to the bands 106 and 158, respectively, in the embodiment of FIGS. 6 and 7. The bands 130 are supported on a small diameter surface 132 while the band 128 is supported on a larger diameter surface 134. A gear 136 is secured on the end of the roller 126 and the teeth on the gear engage teeth on the end of the shaft 118.

In operation, if torque is applied to the wheel 122 in a clockwise direction, the differential in diameter between the smaller surface 132 and the larger surface 134 produces a clockwise rotation of the roller 126, a clockwise progression of the roller and a clockwise rotation of the wheels 124 which serve as the output elements of the apparatus.

The ratio of angular velocity of the wheel 124 relative to the wheel 122 is expressed by the following equation:

$$\frac{W_c}{W_a} = \frac{1 - \frac{R_{bc}R_d}{R_{bd}R_c}}{1 - \frac{R_{ba}R_d}{R_a R_{bd}}}$$

In the above equation, $R_a$ is the radius of the wheel 122, $R_{ba}$ is the radius of the roller surface 134, $R_{bc}$ is the radius of the roller surface 132, $R_{bd}$ is the radius of the gear 136, $R_c$ is the radius of the wheels 124 and $R_d$ is the radius of the gear on the shaft 118. If the gear 136 and the gear on the shaft 118 were replaced by belt pulleys, and an open belt were applied over the pulleys, the above equation expressing the ratio of angular velocity of the wheels 124 to the wheel 122 would remain the same, except that both of the minus signs would be replaced by plus signs.

In each of the embodiments illustrated and described herein, the larger diameter of the roller has been shown to be inboard or between two smaller diameters. Other embodiments result by making the inboard diameter smaller than the outboard diameters. The equations for each embodiment remain valid, but directions of rotation may be opposite to those discussed in each embodiment. The direction of rotation of the output with respect to the input is given by the algebraic sign when the equations are solved; a plus sign indicates that the input and output rotate in the same direction and a negative sign indicates that the input and output rotate in opposite directions.

In the embodiments illustrated and described herein, the input element has been described as the wheel 12 in the embodiment of FIG. 1, the stationary member 90 in the embodiment of FIG. 6 and the wheel 122 in the embodiment of FIG. 8. The apparatus of these three embodiments is reversible, and instead of amplifying rotation, rotation can be reduced between the input and output member by operating the apparatus in the opposite mode. For example, the shaft 86 of FIG. 3 may become the input member and the wheel 12 may become the output member. Similarly the member 116 in the embodiment of FIG. 6 may become the input member and the shaft 96 may become the output member. In the embodiment of FIG. 8, the wheels 124 may become the input member and the wheel 122 may become the output member. In each case, the equation for the respective embodiments would be the inverse of the equations as set forth above.

Another variation that is possible may be illustrated with respect to the apparatus of FIGS. 8 and 9. If the support 120 is eliminated and the shaft 118 is used as a second input, the resulting motion of the output wheels 124 is dependent upon both inputs, as is the case in conventional geared differentials. The same effect can be obtained in the other two embodiments by changing the stationary member to a rotatable input.

Another variation of this invention would use two or more planetary rollers rather than the one shown in each embodiment. One identical additional roller and gear on the opposite side of the assembly would produce a balanced assembly which is much less susceptible to gravity or other accelerations such as from shock or vibration. A second roller and gear can also be very effective in eliminating backlash in the gearing. Finally, additional rollers and gears can transmit higher torques.

The motion transmitting apparatus of this invention has significantly fewer components than conventional devices having even lower amplification ratios. Precision machining of gearing and other components, which is commonly employed in conventional rotary motion devices has been eliminated, without resulting in slippage between relatively movable components. Due to the use of bands for transmitting rotary motion, sliding friction, such as usually occurs in gearing, is not present. Also, the relatively thin, resiliently flexible bands accommodate slight variations in size between the components, and dust and dirt particles do not interfere with the movement of the bands. Since the components are tightly bound together by the bands, the apparatus is resistant to shock. Furthermore, the apparatus of this invention does not require expensive materials or manufacturing techniques.

While this invention has been illustrated in several preferred embodiments, it is recognized that variations and change may be made therein without departing from the invention as set forth in the claims.

What is claimed is:

1. Rotary motion transmitting apparatus comprising:
   a. base means having a guide surface concentric with a base axis that is fixed with respect to said base means;
   b. a roller
   c. retainer means holding said roller against said guide surface while allowing said roller to roll along said guide surface, said retainer means including a thin flexible band encircling and remaining in engagement with substantially the entire circumference of said roller, the central axis of said roller being substantially parallel to said base axis and being displaced along a path concentric with said base axis in response to rolling of said roller;
   d. rotary input means mounted for rotation about said base axis;
   e. first connecting means providing a driving connection between said input means and said roller for rolling said roller along said guide surface in response to rotation of said input means;
   f. rotary output mean mounted for rotation about said base axis; and
   g. second connecting means providing a driving connection between said roller and said output means thereby rotating said output means in response to rolling of said roller along said guide surface, whereby amplification of rotary motion between said input and output means is produced.

2. Rotary motion transmitting apparatus according to claim 1 wherein said guide surface has a radius with respect to said base axis that is less than the distance between said roller central axis and said base axis.

3. Rotary motion transmitting apparatus according to claim 1 wherein said flexible band is normally substantially flat and is flexed in a loop around said circumference of said roller, said retainer means including means preventing longitudinal sliding of said band relative to said guide surface.

4. Rotary motion transmitting apparatus according to claim 3 wherein portions of said band in said loop cross each other along an axis of intersection, said axis being between said roller and said guide surface.

5. Rotary motion transmitting apparatus according to claim 4 wherein said band has substantially uniform thickness, and said axis of intersection is spaced from said guide surface a distance greater than one-half the thickness of said band, whereby said band accomodates variations in spacing between the roller and the guide surface.

6. Rotary motion transmitting apparatus according to claim 1 wherein said rotary input means includes a wheel having a peripheral surface concentric with said base axis, and said first connecting means including a thin, flexible band interconnecting said roller and aid wheel peripheral surface, said band forming said driving connection between said roller and said wheel.

7. Rotary motion transmitting apparatus according to claim 6 wherein the radius of said wheel is less than the radius of said guide surface with respect to said base axis, said roller including a first portion aligned with said wheel and a second portion aligned with said guide surface, said roller portions being substantially cylindrical and being concentric with said roller axis, said first roller portion having a diameter greater than said second roller portion.

8. Rotary motion transmitting apparatus comprising:
a. body means having a guide surface concentric with a central body axis;
b. a roller having a primary rolling surface and a secondary rolling surface, said primary and secondary surfaces being substantially cylindrical and concentric with the central axis of said roller;
c. supporting means supporting said primary surface for rolling along said guide surface, with the central axis of said roller substantially parallel to said body axis;
d. a wheel mounted for rotation relative to said body about said body axis, said wheel having a peripheral surface in alignment with said secondary surface on said roller;
e. drive means between said wheel and said roller, said drive means including a thin, flexible band, said band encircling and being in engagement with substantially the entire circumference of said secondary surface, said band being secured against longitudinal slippage relative to said wheel peripheral surface;
f. an output shaft mounted for rotation relative to said body about said body central axis; and
g. means for transmitting rotary motion from said output shaft whereby said output shaft rotates in response to rotation of said wheel.

9. Rotary motion transmitting apparatus according to claim 8 wherein the radius of said wheel peripheral surface is less than the radius of said guide surface with respect to said body axis, and the diameter of said secondary surface is greater than the diameter of said primary surface on said roller.

10. Rotary motion transmitting apparatus according to claim 8 wherein the radius of said wheel peripheral surface is greater than the radius of said guide surface with respect to said body axis, and the diameter of said secondary surface is less than the diameter of said primary surface on said roller.

11. Rotary motion transmitting apparatus according to claim 8 including a pair of members spaced apart axially on said body axis and a third member interposed between said pair of members, said pair of members each having substantially the same radius with respect to said body axis, said wheel being one of said members, and said guide surface being on at least one other of said members.

12. Rotary motion transmitting apparatus according to claim 11 wherein said guide surface is on said pair of members, and said wheel peripheral surface is on said third member.

13. Rotary motion transmitting apparatus according to claim 12 wherein said pair of members are mounted for rotation about said body axis.

14. Rotary motion transmitting apparatus according to claim 8 wherein said supporting means includes a thin, flexible band encircling and being in engagement with substantially the entire circumference of said primary surface, said band being secured against longitudinal slippage relative to said guide surface.

15. Rotary motion transmitting apparatus comprising a shaft having a central axis, a pair of first surfaces concentric with said shaft axis, said first surfaces being spaced apart axially relative to said shaft and having substantially the same radius with respect to said shaft axis, a second surface concentric with said shaft axis, said second surface being interposed between said first surfaces, a roller having a primary concentric surface and a secondary concentric surface with respect to the central axis of said roller, said primary surface being aligned with each of said first surfaces, said secondary surface being aligned with said second surface, thin, flexible bands encircling and being in engagement with substantially the entire circumference of said primary surface and said secondary surface, said bands being secured on said first and second surfaces, respectively, to prevent longitudinal movement of said bands relative to said surfaces, said first and second surfaces being capable of relative rotation about said shaft axis, whereby said roller rolls along said surfaces with amplified motion.

16. Rotary motion transmitting apparatus according to claim 15 wherein said first surfaces are fixed relative to each other, and said second surface rotates about said shaft axis.

17. Rotary motion transmitting apparatus according to claim 15 wherein said second surface is fixed relative to said first surfaces, said first surfaces being mounted for rotation about said shaft axis.

18. Rotary motion transmitting apparatus according to claim 15 wherein said first and second surfaces are mounted for rotation about said shaft axis.

19. Rotary motion transmitting apparatus according to claim 1 wherein said guide surfaces includes at least a sector of a cylinder and said rotary input mean include at least a sector of a cylinder concentric with said base axis and cooperating with said first connecting means in providing said driving connection between said input means and said roller.

20. Rotary motion transmitting apparatus according to claim 15 wherein said first and second surfaces are each at least a sector of a cylinder, the radius of said first surface being different from the radius of said second surface, and the radius of said primary surface being different from the radius of said secondary surface, the sum of the radii of tee first surfaces and the primary surface being substantially equal to the sum of the radii of the second surface and the secondary surface.

* * * * *